United States Patent Office.

PHILIPP MEYERCORDT, OF CHICAGO, ILLINOIS.

*Assor to Self & Henry Winter of the same place*

Letters Patent No. 82,020, dated September 8, 1868.

---

IMPROVEMENT IN SEWER-PIPES.

---

*The Schedule referred to in these Letters Patent and making part of the same.*

---

TO ALL WHOM IT MAY CONCERN:

Be it known that I, PHILIPP MEYERCORDT, of Chicago, in the county of Cook, and State of Illinois, have invented a new and useful Improvement in Sewer-Pipes; and I do hereby declare that the following is a full, clear, and exact description thereof, which will enable others skilled in the art to make and use them, reference being had to the ingredients of which the pipes are composed.

This invention relates to a novel method of manufacturing porous pipes for sewers, drains, wells, and for other purposes, and its nature consists in the use of sawdust and charcoal mixed with clay and sand, in such proportions as will, when the sawdust and charcoal are burned out, make the shell sufficiently porous or have such a number of small apertures as will permit water in any desired quantity to pass through; and in the application of sulphuric acid to the pipes when warm, for the purpose of strengthening them, and neutralizing any lime which may be in the clay.

The necessary clay for making any desired quantity of pipes is first finely prepared, as when making pottery or brick, and when the clay is properly ground, clean sand is added, in the proportion of four parts to ten and one-half of clay. This compound is then thoroughly mixed, after which ground charcoal and sawdust are added in quantities to make the pipes more or less porous, to suit the locality where they are used, and for the purpose for which they are designed.

For pipes which are used for the improvement of streets and alleys, the quantity of charcoal should be three-fourths of one part, and the same quantity of sawdust. On the contrary, for pipes which are to be used in the sinking of wells, one-half of one part of sawdust and charcoal, each, should be used to four parts of sand and eleven parts of clay. If a greater quantity of the two former are used, the water passing through the shell of the pipes will not be well filtered.

The charcoal can be first reduced to particles of suitable size and added to the other ingredients, or ground with the clay, but in any case it, together with the sawdust, should be thoroughly incorporated with the mixture; this operation to be performed by means of a rake or any mixing-apparatus, now commonly used for a similar purpose.

The mixture thus prepared is moulded into pipes, in the same manner as pipes manufactured from clay or ground stone, and after having been pressed are permitted to dry. They can then be burned in an oven or a kiln, as most convenient. And after they are sufficiently cool to handle, but yet warm, I coat them over with two parts of sulphuric acid, diluted with ten parts of water. This can be done by means of a common mop or sponge fastened to a handle, the acid thus diluted not being strong enough to seriously affect cloth or sponge during the coating process. The acid thus applied will effectually neutralize any lime which may be in the pipes, and also toughen them.

When this kind of pipes is used in the sinking of wells, the first water which enters them should be drawn out, as it is liable to be impure from the effects of the ashes remaining in the cells or apertures of the pipes, from the burned sawdust.

Pipes manufactured in this manner will be found a superior article, and they can be used for many purposes where the common pipes are comparatively useless.

Having thus described my invention, what I claim, and desire to secure by Letters Patent of the United States, is—

The ingredients herein named, when manufactured into pipes, substantially as herein set forth.

PHILIPP MEYERCORDT.

Witnesses:
   G. L. CHAPIN,
   A. HAYWARD.